United States Patent [19]
Engel et al.

[11] Patent Number: 5,544,329
[45] Date of Patent: Aug. 6, 1996

[54] INTERFACE SYSTEM WITH MEMORY MAP LOCATIONS FOR HOLDING FLAGS INDICATING A PRIORITY FOR EXECUTING INSTRUCTIONS HELD WITHIN MESSAGES RECEIVED BY THE INTERFACE

[75] Inventors: Stephen J. Engel, East Northport; Vivian L. Buscemi, New Hyde Park, both of N.Y.

[73] Assignee: Grumman Aerospace Corporation, Los Angeles, Calif.

[21] Appl. No.: 923,365

[22] Filed: Jul. 31, 1992

[51] Int. Cl.⁶ .......................... G06F 13/12; G06F 13/14
[52] U.S. Cl. ................ 395/826; 395/872; 395/825; 364/239; 364/238.2; 364/246.2; 364/262.4
[58] Field of Search .................................. 395/200, 250, 395/275, 325, 650; 370/60, 94

[56] References Cited

U.S. PATENT DOCUMENTS

| | | | |
|---|---|---|---|
| 4,449,182 | 5/1984 | Rubinson et al. | 395/250 |
| 4,590,551 | 5/1986 | Mathews | 395/200 |
| 4,601,586 | 7/1986 | Bahr et al. | 370/94 |
| 4,663,706 | 5/1987 | Allen et al. | 395/200 |
| 4,682,304 | 7/1987 | Tierney | 395/325 |
| 4,799,150 | 1/1989 | Bui | 395/325 |
| 4,893,340 | 1/1990 | Lubarsky et al. | 380/50 |
| 4,926,415 | 6/1990 | Tawara et al. | 370/60 |
| 5,136,580 | 8/1992 | Videlock et al. | 370/60 |
| 5,170,471 | 12/1992 | Bonevento et al. | 395/275 |
| 5,249,292 | 9/1993 | Chiappa | 395/650 |
| 5,325,359 | 6/1994 | Jordan et al. | 395/325 |

*Primary Examiner*—Thomas C. Lee
*Assistant Examiner*—Marc K. Weinstein
*Attorney, Agent, or Firm*—Terry J. Anderson; Karl J. Hoch, Jr.

[57] ABSTRACT

This invention generally relates to data management in a data processing and communication station that acts as an interface station between a central or control terminal and a subsystem. The interface station is adapted to receive messages from and to transmit messages to a control station as well as to receive data from and to transmit data to a subsystem. The interface station comprises a memory unit with multiple map locations having an associated descriptor field including a set of one or more flags. The control station transmits messages to the interface station whereby each of the messages is associated with one of the map locations in the memory unit. The interface station checks the states of the flags in the descriptor field of the associated map location and responds to the message based on the states of the flags.

13 Claims, 7 Drawing Sheets

| INDEX VALUE | MODE CODE |
|---|---|
| 0 | DYNAMIC BUS OFFER |
| 1 | SYNCHRONIZE RT |
| 2 | TRANSMIT STATUS WORD |
| 3 | INITIATE SELF-TEST |
| 4 | TRANSMITTER SHUTDOWN |
| 5 | OVERRIDE TRANSMITTER SHUTDOWN |
| 6 | INHIBIT TERMINAL FLAG |
| 7 | OVERRIDE INHIBIT TERMINAL FLAG |
| 8 | RESET REMOTE TERMINAL |
| | 9 THROUGH 15 ARE RESERVED |
| 16 | TRANSMIT VECTOR WORD |
| 17 | SYNCHRONIZE WITH DATA WORD (RECEIVE ONLY) |
| 18 | TRANSMIT LAST COMMAND |
| 19 | TRANSMIT BIT WORD |
| 20 | SELECTED TRANSMITTER SHUTDOWN |
| 21 | OVERRIDE SELECTED TRANSMITTER SHUTDOWN |
| | 22 THROUGH 29 ARE RESERVED |
| 30 | ADJUST TERMINAL REDUNDANCY DEFAULTS |
| 31 | CONTROL TERMINAL PASSTHROUGH MODE |

FIG.4

INTERFACE SYSTEM WITH MEMORY MAP LOCATIONS FOR HOLDING FLAGS INDICATING A PRIORITY FOR EXECUTING INSTRUCTIONS HELD WITHIN MESSAGES RECEIVED BY THE INTERFACE

BACKGROUND OF THE INVENTION

This invention generally relates to data management in a data processing and communication station that acts as an interface station between a central or control terminal and a subsystem.

Many large control networks comprise a central control station and a multitude of remote terminals; and, in use, each of the remote terminals is connected to a respective one or more peripheral devices or subsystems, so that each remote terminal acts as an interface station between the central control station and one or more of the peripheral subsystems. Each interface station may be used to transform commands and messages from the central control station into the proper format for transmission to the specific subsystem that is connected to the interface station; and the interface station may be used to monitor the performance of the associated subsystem, and to transform data and messages from the peripheral subsystem into the proper or preferred format for transmission to the central control station.

For example, the central control station may transmit numerous data values to the interface station, where those values may be stored until requested for by the subsystem connected to the interface station. Also, the interface station may regularly monitor and maintain a record of the status of the associated subsystem, and this status record may be transmitted to the central control station at the request of that central station.

Many interface stations that are used in the above-described manner have no or limited control over when changes are made to data at the interface station, or when data is transmitted from the station; and when data and data requests are constantly being transmitted between devices, difficulties may arise as a result of the timing of such transmissions. For instance, the central control station may send data to an interface station before the interface station and the associated subsystem have processed previously sent data. Similarly, the central control station may transmit to an interface station a request for the status or data record of the associated subsystem while the interface station or subsystem is updating that status or data record; and if this happens, the interface station may return to the central control station a mix of the old and new status or data records. Other difficulties may also develop with the integrity of the data in systems in which data requests are frequently being made.

Prior art control networks try in various ways to avoid or to minimize problems of the type described above. For instance, certain operating protocols require a minimum time gap between messages transmitted from a central station to any one remote terminal of the network. This does not guarantee data accuracy, however, because, among other reasons, the minimum time gap may not be sufficient to ensure that data is properly updated between transmissions. Also, commonly both the central control station and each subsystem is provided with a software program to control operation of the respective devices; and often when the subsystem software is being written, the designer does not know of the specific control station, or of the specific control station software, with which the subsystem will eventually be used.

SUMMARY OF THE INVENTION

An object of this invention is to improve the integrity of the data transmitted from a data processing and communication station that acts as an interface station between two other data processing devices.

Another object of the present invention is to provide an interface station, of the type that receives messages and data from and transmits messages and data to a pair of other data processing devices, with the flexibility of processing each received message according to different procedures depending on various conditions of or relating to the interface station or the received message.

A further object of this invention is to associate each type of message that can be transmitted to an interface station with a respective one descriptor field having a multitude of flags identifying various conditions of or relating to the interface station or of that message type, and to process each message received by the interface station in a manner depending, in part, on the states of the flags in the associated descriptor field.

Still another object of this invention is to help insure that data transmitted from a data interface station is accurate even though that station itself may have no or limited control over either when changes are made to the data at the station, or when data is transmitted from the station.

Another object of this invention is to guarantee efficient and timely processing of transmitted or received information through the programmable assignment of message priorities and automatic manipulation of data and control information.

These and other objectives are attained with a data interface station and a method of operating a data interface station. The interface station is adapted to receive messages from and to transmit messages to a control station, and to receive data from and to transmit data to a subsystem; and the interface station comprises a memory unit including a multitude of map locations, each of which has a respective one address. The method comprises the steps of providing each map location with a respective one descriptor field including a set of one or more instruction flags. Each of these flags has and is changeable between first and second states, and these flags are used to indicate the conditions of a plurality of factors. The method further comprises the steps of transmitting messages to the interface station from the control station; and associating each of the messages with one of the addressable map locations in the memory unit of the interface station. The interface station, upon receipt of each message from the control station, checks the states of the flags in the one descriptor field at the memory address associated with the message, and responds to the message on the basis of the states of the flags in that one descriptor field.

Further benefits and advantages of the invention will become apparent from a consideration of the following detailed description, given with reference to the accompanying drawings, which specify and show preferred embodiments of the invention.

BRIEF DESCRIPTION OF THE DRAWINGS

FIG. 4 lists various mode code commands that may be used in the operation of the network of FIG. 1.

FIG. 5 illustrates a flag word that may be kept in the bus interface units of the interface stations of the control network.

DETAILED DESCRIPTION OF THE PREFERRED EMBODIMENTS

Figure 1:
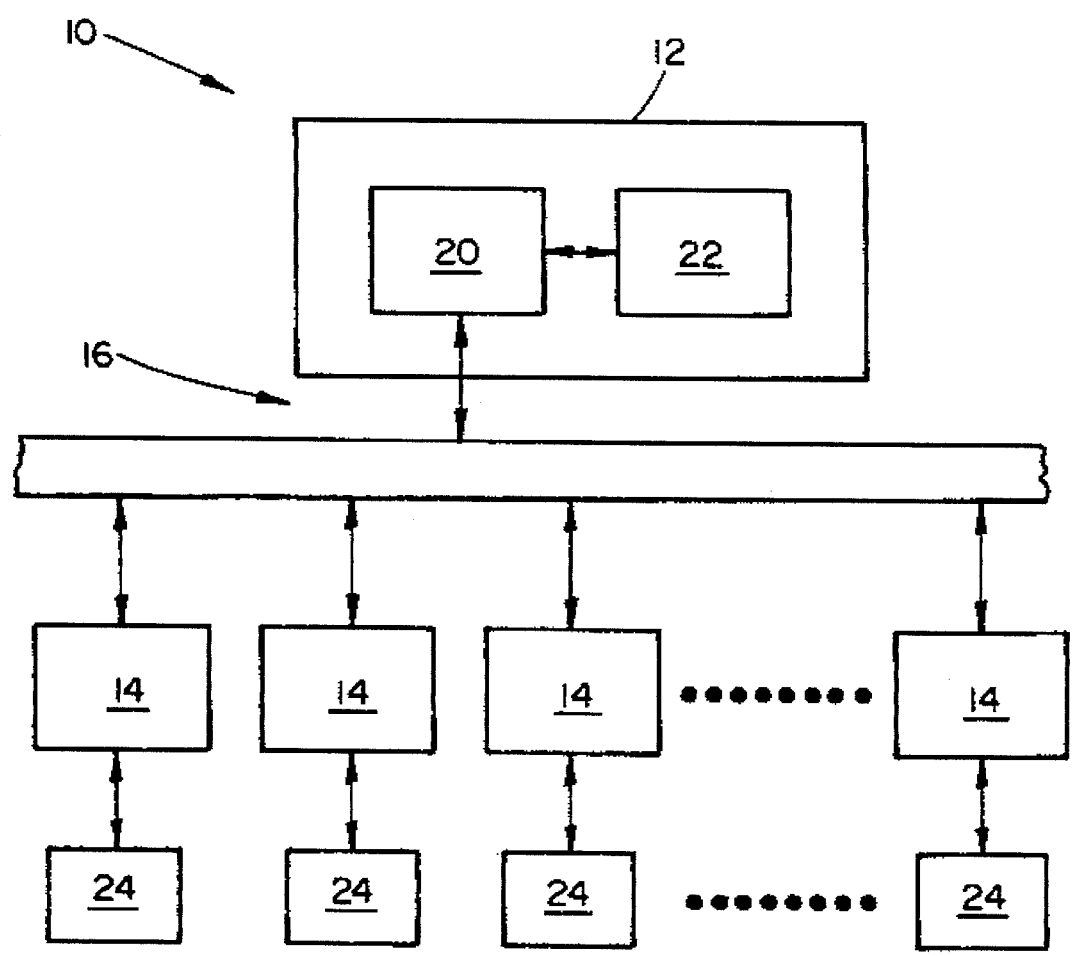
FIG. 1 illustrates a control network including a multitude of interface stations embodying the present invention.

FIG. 1 schematically illustrates a control network 10 generally comprising a central unit 12, a multitude of distributed stations or terminals 14, and data transmission means 16; and preferably, central unit 12 includes control station 20 and data storage center 22. FIG. 1 also shows a multitude of subsystems 24, with each of the subsystems 24 connected to a respective one of the stations 14, which thus act as interface stations between control station 20 and the subsystems 24. The central control station 20 provides various control and monitor functions for network 10, and this station is normally also used to connect network 10 to various peripheral devices that may be used to control selected aspects of the network and to provide further monitoring and data storage services. Data storage center 22 is provided to store various programs that may be transmitted to and used by central station 20, the distributed stations 14, and the subsystems 24.

Data transmission means 16 is used to transmit data between the central unit 12 and those interface stations 14, and between the interface stations themselves. Any suitable means may be employed to transmit data between central unit 12 and stations 14. For example, this data may be transmitted by cables or wires that are physically connected to central unit 12 and to the interface stations; or alternatively, this data may be transmitted by electromagnetic wave signals without requiring any direct physical connection between the central unit and the distributed interface stations. Preferably, as discussed below, transmission means 16 comprises a data bus; and more preferably, it comprises a pair of parallel or redundant data busses, each of which is connected to each of the distributed stations and to control station 20. Even more preferably, these data busses satisfy the requirements set forth in military standard MIL-STD 1553, and thus are of the type referred to in the art as 1553 busses.

Network 10 may take many specific forms and be used in many specific applications. For instance, network 10 may be employed as part of an armament management system that is used to manage and to operate a multitude of stores or weapons. As additional examples, distributed stations 14 may be data input or output terminals controlled, at least in part, by central unit 12; or network 10 may be used on a space craft, with each of the distributed stations 14 connected to a mechanical device or mechanical equipment used to perform a specific experiment or task. As still another example, network 10 may be used in a factory, with each of the distributed interface stations 14 connected to a work station, a robot or other device that may be controlled by central unit 12.

Figure 2:
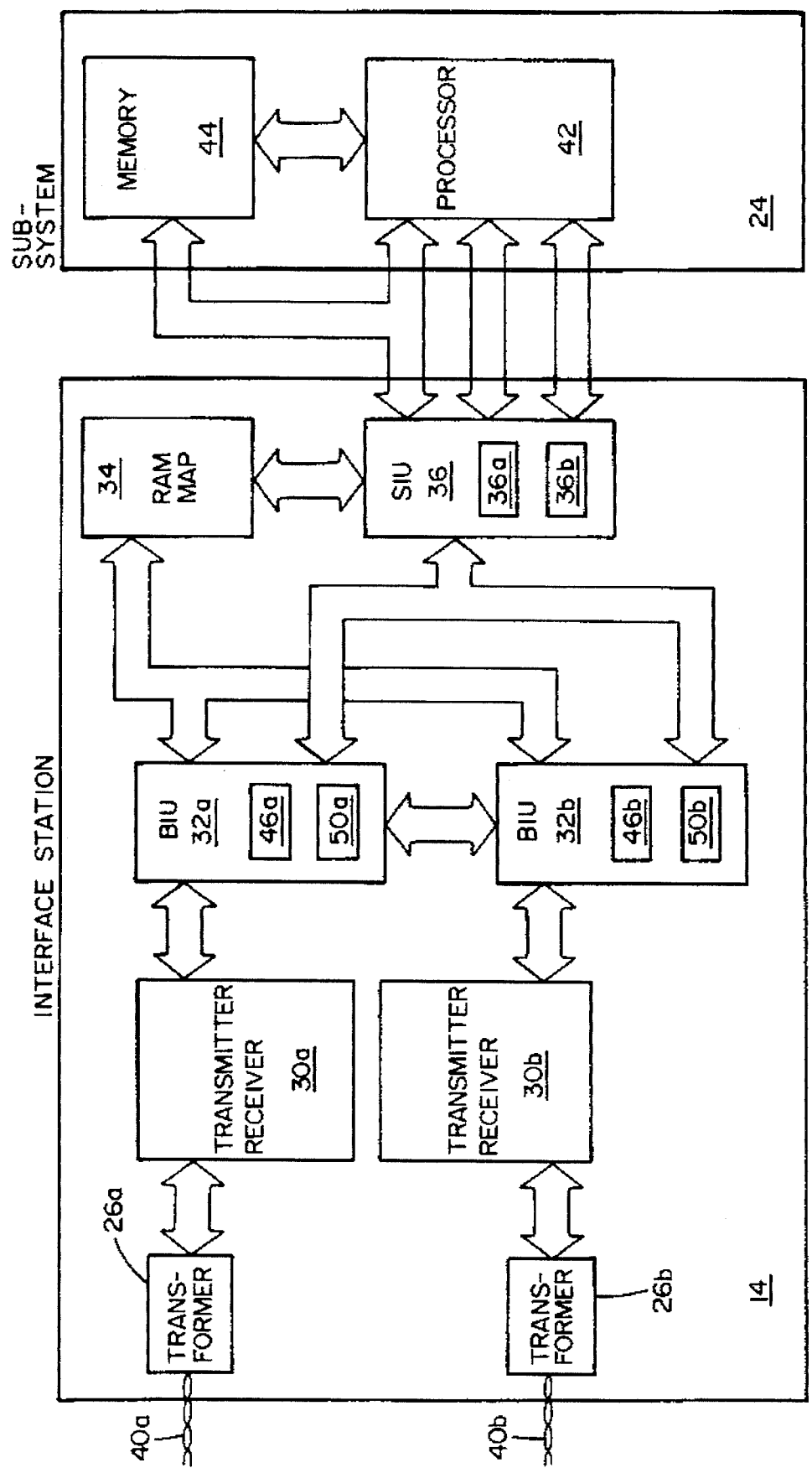
FIG. 2 schematically shows in greater detail one of the interface stations and one of the subsystems of the control network of FIG. 1.

The interface stations 14 of network 10 are substantially identical; and with reference to FIG. 2, each interface station includes a pair of transformers 26a and 26b, a pair of transmitter-receiver units 30a and 30b, a pair of bus interface units 32a and 32b, a ram unit 34, and a subsystem interface unit 36. FIG. 2 also shows the preferred two data busses, referenced at 40a and 40b, of data transmission means 16; and this Figure shows one of the subsystems 24, which, as shown, includes a subsystem processor 42 and a subsystem memory 44.

The general functions of the elements of interface station 14 are well known to those skilled in the art and to some extent described by MIL-STD 1553A-B. Transformer 26a is connected to data bus 40a to electrically couple ac signals between that data bus and transmitter-receiver 30a; and similarly, transformer 26b is connected to data bus 40b to electrically couple ac signals between that data bus and transmitter-receiver 30b. Transmitter-receiver unit 30a receives data from transformer 26a and filters and conditions the received signal 30 so that bus interface unit 32a can check the received information for various errors; and if none of these errors are detected, the interface station and subsystem respond according to a prescribed protocol such as specified by MIL-STD 1553A-B. Likewise, transmitter-receiver unit 30b receives data from transformer 26b and filters and conditions that data so that bus interface unit 32b can check the received information for various errors. If none of those errors are detected, the interface station and subsystem also respond according to a prescribed protocol. Transmitter-receiver units 30a and 30b also receive data from the bus interface units and amplify and condition that data for subsequent transmission to data bus 40a or data bus 40b.

Each bus interface unit 32a, 32b controls the transmission of data between subsystem interface unit 36 and data busses 40a and 40b, and also transmits data between itself and the other bus interface unit. Each bus interface unit 32a, 32b may include a register area 46a, 46b and a control logic sequencer 50a, 50b. Data received from either subsystem interface unit 36 or from the associated transmitter-receiver unit 30a or 30b is temporarily stored in the register area of the bus interface unit, and the control logic sequencer of each bus interface unit may be provided with a suitable program to implement and control the operation of the bus interface unit. Each bus interface unit is also preferably directly connected to the subsystem interface unit to provide the bus interface unit with the ability to transfer data directly between the bus interface unit and the subsystem interface unit.

The subsystem interface unit 36 controls the transmission of data between bus interface units 32a and 32b and subsystem 24, and the subsystem interface unit may also include a register area 36a and a control logic sequencer 36b. Data received from either bus interface units 32a and 32b or from subsystem 24 may be temporarily stored in register area 36a, and control logic sequencer 36b may be provided with a suitable program to implement and control the operation of the subsystem interface unit. Subsystem interface unit may also be provided with an analog-to-digital converter (not shown) and a digital-to-analog converter (not shown). The former converter may be used to transform analog signals received from subsystem 24 to a digital form suitable for use in interface station 14, and the latter converter may be used to transform digital signals to an analog form suitable for transmission to subsystem 24.

Each of the interface units 32a, 32b, 36 may include additional elements that, for the sake of clarity, have been omitted from the drawings. For example, each of these interface units may include one or more buffers to buffer the transfer of data into and out from the interface unit, and a clock to help control the sequence and timing of the transmissions of data to, from, and within the interface unit. Each interface unit may also be provided with a terminal (not shown), such as a terminal referred in the art as an RS-232 terminal, to connect the interface unit directly to an external monitor or other device. This external device may be used, for example, to monitor data or any software programs stored in the interface unit, for instance, possibly to debug any of the software programs or to add data to or to delete data from the interface unit.

The configuration of the interface station 14 described above produces multiple data paths through the station, and this produces a high degree of safety and reliability even in the event of errors or faults within the station. More specifically, data may be transmitted to and from the interface station over either data bus 40a or 40b; and, in the interface station, data may be transmitted between either bus interface unit 32a and 32b and the subsystem interface unit 36, between either bus interface unit and memory unit 34, and between that memory unit and the subsystem interface unit. Hence, for example, data can be transmitted from data bus 40a to the bus interface unit 32a, and then, using information in memory unit 34, to the subsystem interface unit 36, from where it can subsequently be directed to the proper place in subsystem memory 44. However, if for some reason, bus interface unit 32a is diagnosed as faulty, then data from data bus 40a can be retransmitted on data bus 40b, through transmitter-receiver 30b to bus interface unit 32b and then, using information in memory unit 34, to the subsystem interface unit 36, from where it can subsequently be directed to the proper place in subsystem memory 44.

Conventional or well-known built-in test functions may be employed to determine the preferred data flow path through interface station 14. Also, a pair of independent power supplies (not shown) are preferably provided for interface station 14, allowing the station to operate effectively even if one of those power supplies becomes ineffective.

The transmission of data between and among control unit 12 and interface stations 14 of network 10 is preferably controlled by the control station 20, which is thus referred to as the bus controller. With modifications within the skill of those ordinary skilled in the art, network 10 may be designed so that the bus control functions may be passed among all of the stations of the system. Generally, the bus controller is responsible for transmitting data bus commands, participates in data transfer, receives status responses, and generally monitors the system status.

Data is transmitted to and from the control station 20 and the distributed stations 14 of network 10 via system data bus 16 in the form of "messages," each of which consists of one or more "words." Three types of words are used in this data transmission: status words, command words, and data words. For example, as in a receive message, the first word in a message may be a command word, the command word may be followed by multitude of data words, and the last word in the message may be a status word. Generally, all control messages originate with the bus controller and are transmitted to a single receiver or to multiple receivers. Data words are used to communicate data between and among the stations, while command words and status words are used to manage data flow through the system.

Generally, each bus interface unit of each station 14 maintains a status word to indicate various conditions of or related to that station; and normally each time a station 14 transmits a message, the status word of the station is included in the message so that the station that receives the message is also advised of the status of the transmitting station. Command words are transmitted from one station to another to command the latter station to take some type of action. There are three types of command words: commands to receive a message, commands to transmit a message, and commands, referred to as mode-code commands, that instruct a station to take a particular action or to change the way in which the station is functioning.

Figure 3:
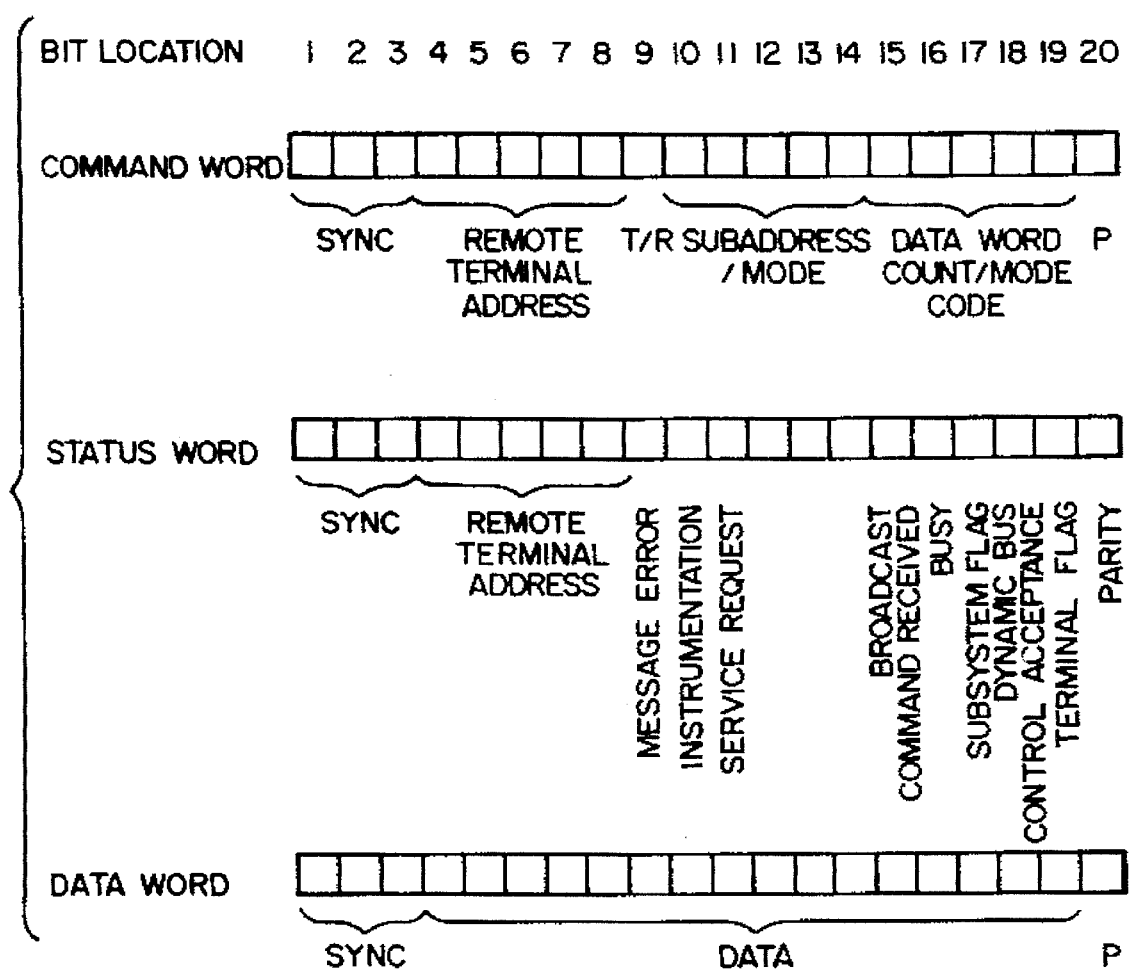
FIG. 3 shows the formats for various words transmitted between the stations of the network of FIG. 1.

Any suitable format may be used for the status, command, and data words, although preferably this format is of the type set forth in military standard MIL-STD 1553, and FIG. 3 illustrates this preferred format. Similarly, the messages may be transmitted over the data buses in any suitable procedure, although preferably the procedure also is that set forth in military standard 1553.

With reference to FIG. 3, each command word includes 20 bits. The first three bits, in bit locations 1 through 3, provide a wave form referred to as a synch wave form, which separates the word from any preceding word and synchronizes the receiving terminal with the command word. The wave form of these three bits also identifies the word either as a data word, or as a command or status word. Bit locations 4 through 8 give the address of the remote terminal for which the command is intended. If the command is not a mode-code command, bit location 9 identifies the command as either a command to receive a message or a command to transmit a message. For example, if the command is not a mode-code command, the value of one at bit location 9 may be used to identify the command as a command to transmit, while a value of zero at bit location 9 may be used to identify the command as a command to receive.

Bit locations 10 through 14 are used to indicate either an address in a remote terminal, or to identify the word as a mode-code command. More specifically, any one of the values zero through 31 may be stored in the field comprising bit locations 10 through 14; and certain of these values may be reserved to identify the word as a mode-code command, with the other, non-reserved values identifying an address in the receiving terminal. For example, the values zero and 31 may be used to identify the word as a mode-code command, while values 1 through 30 may be used to identify an address in the receiving terminal or station. These addresses in the receiving station are referred to as subaddresses and identify the type of data to be transmitted or received. As explained in greater detail below, this subaddress is used to find data in the memory unit 34 that, in turn, contains an address in subsystem memory 44, referred to as a target address, from which a message is to be taken (if the command is a command to transmit a message), or to which a received message is to be stored (if the command is a command to receive a message).

If the word is a mode-code command, then bit locations 15–19 specify the type of mode-code; however, if the word is a transmit or receive command, then bit locations 15 through 19 indicate the number of words in the message to be transmitted or received. Preferably, a maximum of 32 data words may be transmitted or received in any one message. Finally, bit location 20 identifies the parity of the word.

Each remote terminal or interface station is assigned a unique terminal address value and that station accepts all command words having the address value of the terminal.

Also, preferably one selected address value, referred to as the "broadcast value," is not assigned to any of the terminals, but all stations will accept words having this one address value. Thus, each station accepts command words having either its respective address value or the broadcast address value, and preferably these are the only command words that the terminal will accept. For instance, in a system having 31 stations, each station may be assigned a respective one address value between zero and 30, with an address value of 31 being used as the broadcast address value.

The mode codes are employed to put the receiving station into certain states and to help select the manner in which data is routed through the terminal or station. Certain mode codes do not require the transfer of any data words. Other mode codes require that one data word be transferred; and for these mode codes, the t/r bit of the command word indicates the direction in which that data word is transferred—that is, either to or from the station that receives the command. FIG. 4 lists the mode code functions used with network 10 and the values used to identify these codes.

Mode codes zero through 9 are not transmitted with any data words, while mode codes 16 to 21 are transmitted with a data word. As will be understood, some of the mode codes should not be addressed to the broadcast address because it is possible that two or more remote terminals may simultaneously transmit responses onto system data bus 16. For example, the transmit status word function should not be addressed to the broadcast address since this might result in several status words being transmitted on the system data bus at the same time.

The dynamic bus control function is an offer by a bus controller to a remote terminal to transfer control of the data bus 16 to that remote terminal. Whether this offer is accepted or rejected by the receiving terminal depends on a dynamic bus control acceptance bit or flag, which is contained in the status word of that terminal. If this bit is set to a value of one, the receiving terminal accepts the bus control offer; while if this bit is set to zero, or is clear, the bus control offer is rejected. In either case, the terminal receiving the bus control offer transmits its status word back to the offering terminal, so that this terminal knows whether the offer was accepted or rejected. If the offer was rejected, the offering terminal remains as bus controller and may offer bus control to other remote terminals. Once a bus control offer is accepted, the offering terminal relinquishes bus control, and the accepting terminal starts to operate as the bus controller.

The synchronize function instructs the receiving terminal to reset its internal time, and after receiving this command, the receiving terminal transmits its current status word to the bus controller that originated the command. The synchronize with data word function instructs the receiving terminal to synchronize according to information contained in an accompanying data word, and this data word may be provided with any suitable synchronization data. After receiving this synchronize with data word command, the receiving terminal transmits its current status word back to the terminal from which the command was transmitted. This function may be used to facilitate coordination between the active bus controller and the terminal or terminals to which the command is transmitted.

The transmit status word function instructs the receiving station to send to the bus control station the status word associated with the most recent valid command word received by the former station before this transmit status word command.

The initiate self test mode command causes the remote terminal to initiate a self test within the terminal. Any suitable self test may be used with stations 14. Typically, after allowing time to complete the self test, this mode code command is followed by a transmit BIT word command, which orders the receiving station to transmit to the bus controller a word, referred to as a BIT word, that indicates the test results. The transmit BIT word command also causes the remote terminal to transmit its status word to the bus controller. For example, built in tests may be used to detect circuitry failures, power failures, encoder-decoder failures, and protocol errors.

The transmitter shut down function is used to disable a transmitter of a bus interface unit of a station, and the override transmitter shut down function is used to enable a transmitter of a bus interface. When the subsystem interface unit of a station receives a transmitter shut down command via one of the bus interface units of the station, the subsystem interface unit disables the transmitter of the other bus interface unit of the station; and when a subsystem interface unit receives an override transmitter shut down command via one of the bus interface units of the station, the subsystem interface unit enables the transmitter of the other bus interface unit of the station. After receiving either a transmitter shut down command or an override transmitter shut down command, the remote terminal transmits its status word back to the bus controller.

The selected transmitter shut down and the override selected transmitter shut down functions are normally only used in the systems having redundant data buses. The former function instructs a remote terminal associated with one data bus to disable a transmitter associated with another data bus, and the latter function instructs a remote terminal associated with one of the data buses to enable a previously disabled transmitter associated with another of the data buses.

The inhibit terminal flag bit function instructs a terminal to clear a terminal flag bit in its status word to indicate an unfailed condition regardless of the true condition of the terminal; and the override inhibit terminal flag bit function cancels the inhibit terminal flag bit function, so that the terminal flag bit in the status word of the terminal indicates the actual condition of the terminal. When a remote terminal receives either the inhibit terminal flag bit or the override inhibit terminal flag command, the remote terminal transmits its status word back to the bus controller.

The reset remote terminal command causes a remote terminal to return to an initialized state or condition. After receiving such a command, a terminal first returns its current status word to the bus controller, and then resets to an initialized state.

The transmit vector word command instructs a remote terminal to transmit to the bus controller both the status word of the remote terminal and a service request data word, which is conventionally provided in a 1553 bus interface unit to contain information about specific services being required by the remote terminal.

The transmit last command word function instructs a remote terminal to transmit its status word and a data word having bits 4 through 19 of the most recent command word received by the terminal other than a transmit last command word command.

A status word also includes 20 bits and the first three bit locations provide a synch wave form used to separate the word from any preceding word and to synchronize the receiving terminal with the status word. The next five bit locations give the address of the terminal transmitting the status word. The next three bits are referred to as a message error bit, an instrumentation bit, and a service request bit, respectively. Bit locations 12–14 are not used, and preferably each of these bits is set to a value of zero. The next six bits in the status word are referred to as a broadcast command received bit, a busy bit, a subsystem flag bit, a dynamic bus control acceptance bit, and a terminal flag bit, respectively. The last bit location in the status word gives the parity of the word.

The message error bit is used to indicate whether one or more of the data words associated with the most recent command word received from the bus controller had failed a validity test applied by the remote terminal. Several validity tests are standard in 1553 systems, such as those used to test the format of the word and the address of the word. If all of the data words associated with the most recent command word passed all applied tests, the message error bit is set to a value of zero. If any one or more of those words failed any one of the applied tests, however, the message error bit is set to one.

The instrumentation bit may be used to distinguish the status word from a command word. To do this, bit location 10 of all command words is set to a value of one, while the instrumentation bit of each status word is set to a value of zero. Doing this, of course, reduces the number of subaddresses that may be identified by the command word. The use of the instrumentation bit for this purpose is optional, and if it is not used for this purpose, the instrumentation bit is set to zero.

The service request bit indicates whether the terminal needs service. For example, normally the bit may be set to a value of zero to indicate that no service is needed, and the bit may be set to a value of one when the terminal needs service.

The broadcast command received bit indicates whether the most recently received valid command word was addressed to the broadcast address. Whenever such a command is received, bit location 15 is set to a value of one; and, when a command is received that is not addressed to the broadcast address, this bit location is set to zero.

The busy bit indicates whether the remote terminal is able to transmit data to and receive data from its subsystem in response to a command from the bus controller. A value of one at the busy bit indicates a busy condition, in which the remote terminal is not able to transmit data to or receive the data from the store in response to a bus controller command to do so, while a value of zero at the busy bit indicates that the remote terminal is able to transmit and receive such data.

The subsystem flag bit, at bit location 19 of the status word, is used to indicate to the bus controller that a fault condition exists in one of the subsystems of a remote terminal. A value of one at this bit location indicates the presence of such a fault, while a value of zero indicates the absence of any such faults.

The dynamic bus control acceptance bit is used to indicate whether a remote terminal has accepted or rejected a dynamic bus control offering. Normally, this bit is set to zero. To accept a bus control offer, a terminal sets this bit to a value of one, and transmits its status word back to the terminal that made the offer. To reject a bus control offer, a terminal transmits its status word, with the dynamic bus control acceptance bit at a value of zero, back to the terminal that made the offer.

The terminal flag bit is used to indicate whether a fault has been detected or sensed in a terminal. If such a fault has been detected or sensed, this bit location is set to a value of one, while a value of zero at this bit location indicates the absence of any such fault.

The parity bit is provided to help detect any errors that may occur as a status word is transmitted or detected. This bit is given a value of one or zero depending on whether the sum of the values of the other bits of the status word is odd or even, respectively.

Any suitable procedures may be used to reset the values at status bit locations 8 through 11 and 15 through 20. For instance, in accordance with standard 1553 practice, these bit locations may be reset to zero upon receipt of selected command words. A remote terminal transmits a status word whenever it receives a non-broadcast valid legal command word and the proper number of contiguous valid data words.

After transmitting a command to receive word, the bus controller then transmits data to the remote terminal; and if this message is properly prepared and formatted, the number of data words in the message is equal to the value in the word count field of that command to receive word. After receiving a valid command to receive, a station then accepts the following number of message words specified in the word count field of the command to receive. If this message is a valid message, the entire message is then transmitted to a buffer area in the memory unit of the subsystem.

After a station receives a valid command to transmit, one of the bus interface units of the station assembles the appropriate message and subsequently transmits that message to system bus 16.

Each bus interface unit includes a number of flags, schematically represented in FIG. 5, that are used to indicate various conditions. A first flag is used to indicate when a valid mode code has been received; and normally this flag has a value of zero, and the flag is set to one when a valid mode code has been received. A second flag is used to indicate when a complete message has been received; and normally this flag has a value of one, and the flag is set to zero when a complete message has been received. A third flag is used to indicate when an invalid message has been received; and normally this flag has a value of one, and the flag is set to zero when a received message is detected as invalid. A fourth flag is used to indicate when a valid command has been received, and normally this flag is set to zero, and the flag is set to one when a valid command has been received by the transceiver and transformer.

As previously mentioned, with prior art interface stations that are configured and operated as generally described above, it has often been difficult to guarantee the integrity of the data transmitted from the interface station due, in part, to the fact that the station does not have complete control over the timing of the messages and data transmitted to it by the bus controller and by the subsystem. Memory section 34 of interface station 14 is specifically configured to address this prior art difficulty.

Figure 6:
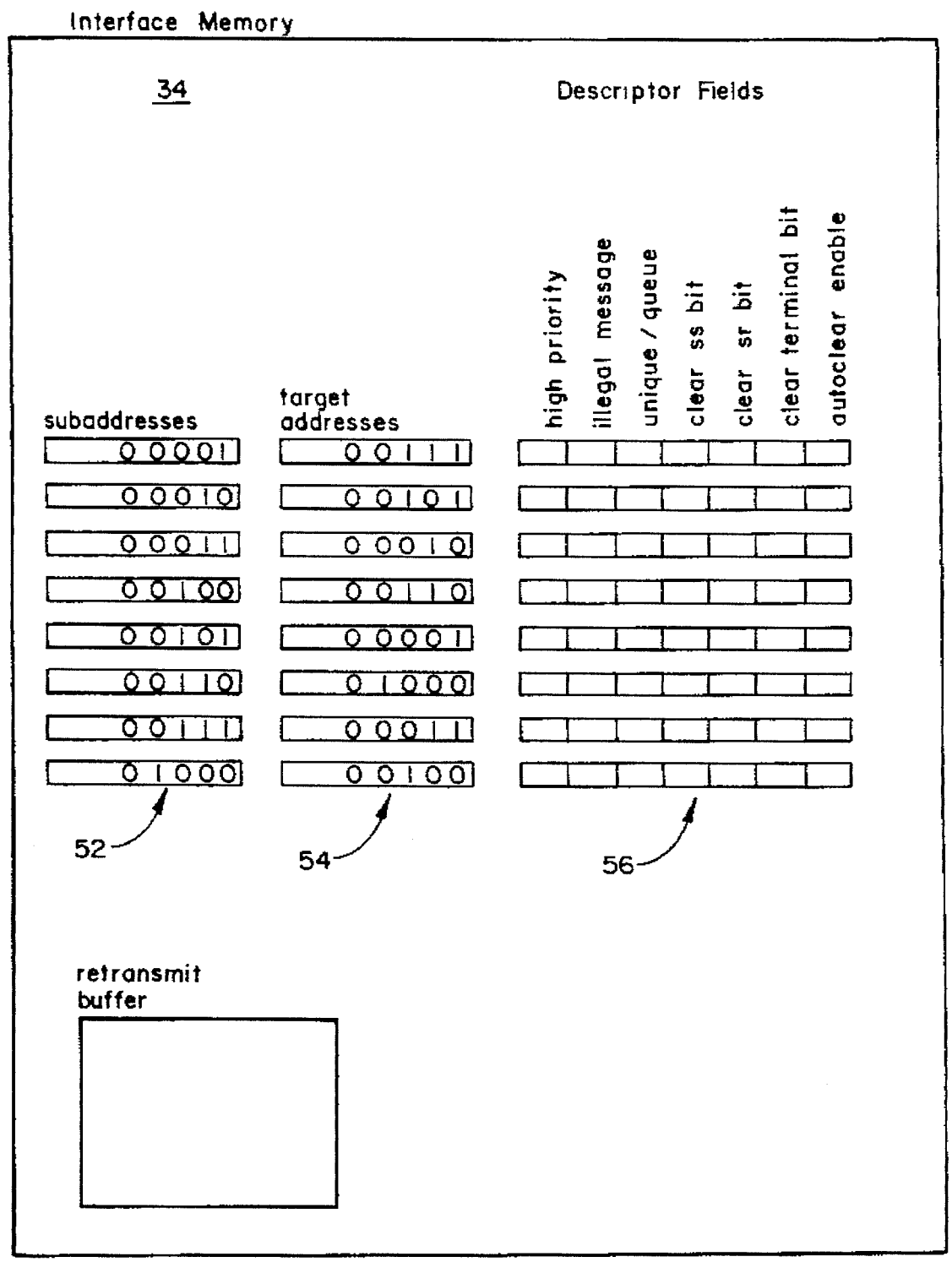
FIG. 6 schematically illustrates a memory unit of the interface station.
Figure 7:
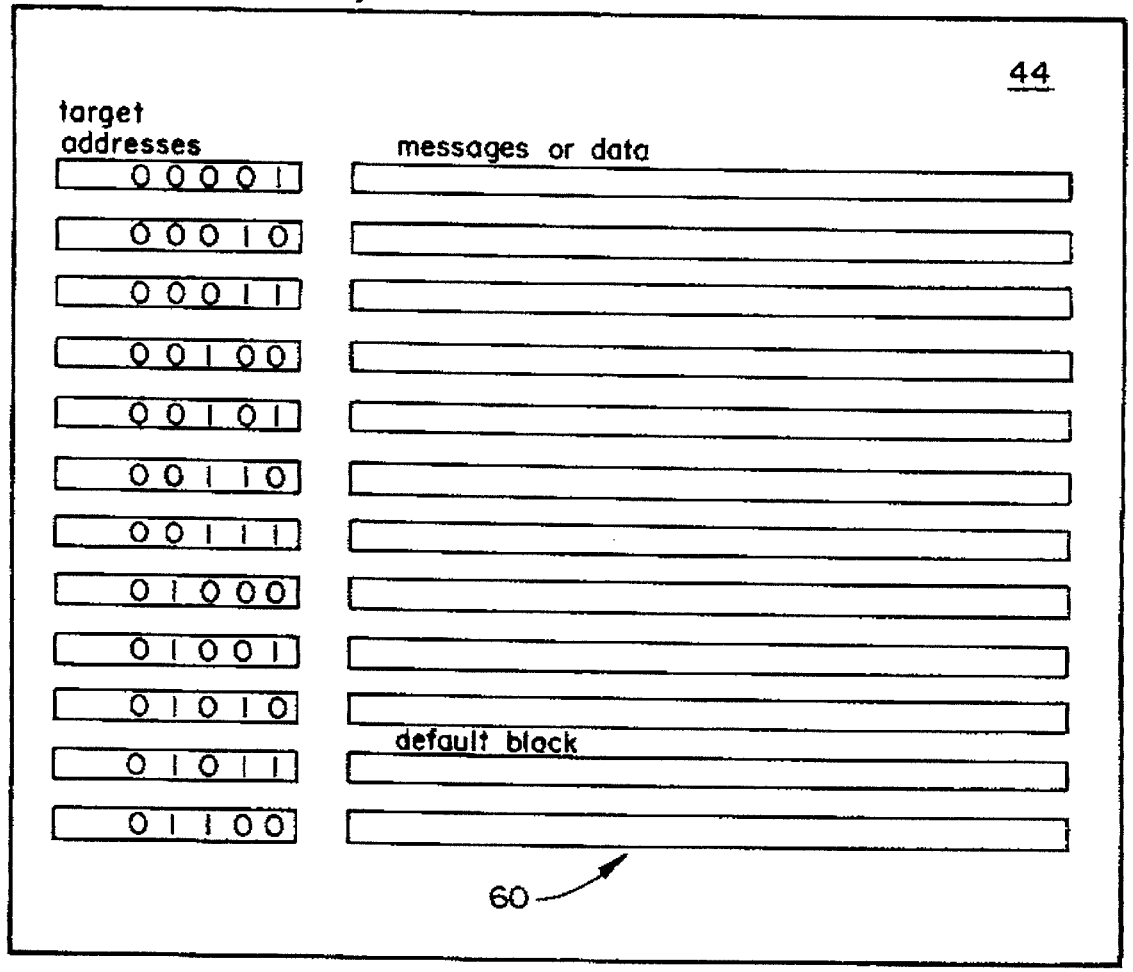
FIG. 7 schematically shows a memory unit of the subsystem shown in FIG. 2.

With reference to FIGS. 6 and 7, interface memory unit 34 is a dynamic message map made of subsystem accessible random access memory, and the contents of this ram map serve as a table of pointers to subsystem memory unit 44. Memory unit 34 includes a multitude of addressable map locations 52, each of which includes a pointer, or target address 54, and a descriptor field 56. Each descriptor field contains a set of flags to indicate the status or conditions of a plurality of parameters or factors.

Preferably, each message or each of selected messages that can be transmitted to interface station 14 from bus controller 20 is associated with a respective one of the map locations 52 in memory unit 34; and when station 14 receives a given message, the subsystem interface unit 36 checks the descriptor field in the one of the map locations 52 associated with the given message, and then selects a particular procedure for processing, or otherwise responding to, the received message on the basis of the states of the flags in that associated descriptor field. Moreover, preferably, the flags of the descriptor fields 56 can be changed or altered dynamically by the subsystem processor 42 as the factors or parameters represented by those flags change.

The flags of the descriptor fields 56 may represent virtually any condition of or relating to station 14, subsystem 24, or the messages or data transmitted to the interface station. Preferably, however, each descriptor field contains the same set of flags.

For example, each descriptor field 56 may contain seven flags referred to as:

i) a high priority interrupt flag, ii) an illegal message received flag, iii) a unique/queue mapping flag, iv) a reset subsystem service bit flag, v) a reset service request bit flag, vi) a reset terminal bit flag, and vii) an autoclear enable flag.

The high priority interrupt flag is used to indicate to subsystem interface unit 36 that a received message is to be processed immediately or at least given a high priority. To elaborate, normally the subsystem interface unit processes messages from the bus controller in the order in which those messages are received by the interface station. It is possible that messages may be transmitted to the interface station at a rate faster than the rate at which the subsystem interface unit can process those messages, however; and if this happens, a backlog of unprocessed messages can accumulate in the interface station. Each time a message is transmitted to the bus interface unit, the subsystem interface unit checks the high priority interrupt flag in the descriptor field in the map location associated with the received message. If that flag is set, then that message is processed immediately, or at least given a high priority, by the subsystem interface unit, regardless of whether other messages are waiting to be processed. If that high priority interrupt flag is clear, though, then the received or associated message is not to be given high priority, and the subsystem interface unit processes the message according to the normal priority assigned to the message.

For example, each high priority interrupt flag may be high or have a value of one to indicate that the associated message is to be given a high priority, and be low or have a value of zero to indicate that the associated message is not to be given such high priority.

The illegal message flag is used to instruct the subsystem interface unit to respond to a received message as if that message were illegal. An illegal message is a message that is received without transmission error; that is, has the proper number of bits, format, parity, etc., but is not to be implemented by interface station 14 or subsystem 24. For example MIL-STD 1553 provides for several message types, but not every application of MIL-STD 1553 requires the use of all of these message types. If a message type is not to be used in an application, that message type is declared as illegal. An invalid message, in contrast, is defined as a message with a transmission error.

An interface station responds to an illegal message by, first, setting the message error bit in the status or flag word (shown in FIG. 3) of the interface station, and second, if the received message is a transmit command, not transmitting the requested message or data. This illegal message flag in the descriptor field may be high or have a value of one to indicate that the associated received message is to be treated as an illegal message, and this descriptor flag may be low or have a value of zero to indicate that the associated received message is not necessarily to be treated as an illegal message.

The unique/queue mapping flag is used to indicate to the subsystem interface unit whether the associated received message is to be sent to a unique target address in the subsystem memory 44, or to the end of a queue in the subsystem memory. The use of this flag provides for a mixed mode of data management. To elaborate, if messages with the same subaddress arrive at interface station at a rate faster than the rate at which the subsystem interface unit of that station can process those messages, then the messages can be stored in a queue, thus retaining all the data in those messages, and eventually all of the messages can be processed. However, these messages may be of a type such that when the subsystem interface unit has a need for a message of this type, the subsystem interface unit only needs access to the last message of this type that was transmitted to the interface station. In this case, all of the messages of this type can be transmitted to the same target address in subsystem memory, with each message simply being written over the previous message stored at that target address. For example, a unique/queue flag at a given interface memory address 52 may be high or have a value of one to indicate that the messages arriving with this address are all to be sent to the same subsystem memory subaddress, or target address, and this flag may be low or have a value of zero to indicate that the associated messages are to be stored in a queue.

The clear subsystem service, clear service request, and clear terminal bit flags in the descriptor fields 56 are used to instruct the bus interface unit to clear those bits in its status word. More specifically, upon receipt of a given message, if the clear subsystem service bit flag is set in the descriptor field at the interface memory address associated with that message, then the bus interface unit clears the subsystem service bit in its status word. Similarly, upon receipt of a given message, if the clear service request bit flag or the clear terminal bit flag are set in the descriptor field in the address assigned to that received message, then the bus interface unit clears the service request bit or the terminal bit, respectively, in its status word. However, upon receipt of a given message, if the clear subsystem service bit flag, the clear service request bit flag, and the clear terminal bit flags are not set in the descriptor field of the address associated with the given message, then the bus interface unit does not necessarily clear those bits in its status word.

These clear or reset flags provide a real time handshake between the bus controller and the interface station for those system protocols that use certain messages to acknowledge that the action initiated by the subsystem service bit, the service request bit, and the terminal bit was taken. For example, if the service request bit is set in a status word transmitted to the bus controller from an interface station, the bus controller typically reacts by sending a transmit vector word mode code back to the interface station; and in response to receiving this mode code, the interface station transmits the vector word and its status word back to the bus controller. If the service request bit is still set in that status word at the time of this retransmission, the bus controller may retransmit the vector word mode code back to the interface station, and the bus controller and the interface station may thereby enter an endless communications loop.

With the present invention, this endless transmission loop can be avoided by setting the clear service request bit flag in the descriptor field in the address associated with the transmit vector word mode code. If this is done, then whenever the interface station receives this mode code, the bus interface unit clears the service request bit in its status word, thereby insuring that when that status word is retransmitted to the bus controller, the service request bit is not set in that retransmitted status word. The clear subsystem service bit flag and the clear terminal bit flag in the descriptor fields 56 may also be used in an analogous manner to prevent other endless transmission loops from developing between the bus controller and the interface station.

The autoclear flag is provided to accommodate those protocols that require that certain data fields be returned to some default value, typically zero, after data values have been transmitted from those fields. To elaborate, in many data management systems, a particular message may ask the interface station to transmit to the bus controller a value for a specific parameter or condition; and in response to receiving such a message, the interface unit sends its current value for that parameter to the bus controller and then resets its own value for that parameter to zero. In this way, if the interface station receives the same message from the bus controller, a zero value will be transmitted back to the bus controller, at least until the value for that specific parameter or condition is changed at the interface station as the result of the operation of that station. In some cases, however, the interface station may receive the repeat message before the interface station has been able to change the associated value to zero; and if this happens, an inappropriate or incorrect value may be sent to the bus controller in response to the receipt of that repeat message. The autoclear flag helps to prevent such an inappropriate or incorrect value from being sent to the bus controller under these conditions.

The autoclear flag is preferably set in the descriptor fields in the memory addresses associated with messages of the above-described type. Then, when the interface station receives a message of this type asking for the value of a particular parameter or condition—or, more precisely, asking for the data value at the target address identified by the interface memory—the following events occur. First, that data value is sent to the bus controller; and second, the subsystem memory target address identified in that associated memory address is changed to point to a default block containing the default value. Hence, if the interface station receives this same message, then the default value at that default block is transmitted to the bus controller.

The subsystem interface unit is preferably programmed or designed such that, after a new value is determined or obtained for the particular parameter or condition, the following events occur. This new value is written into the first of the above-mentioned target addresses—that is, at the subsystem memory target address initially identified in the interface memory address associated with the message—and this first target address is written into the target address field of that interface memory address. In this way, if the bus controller subsequently asks for the data value for the particular parameter or condition, the data value at this first target address in the subsystem memory—rather than the default value—is transmitted back to the bus controller.

Preferably, interface station 14 is also provided with the ability to retransmit the last message transmitted to the bus controller, despite the fact that this message, as it is stored in the interface station, may have changed. To elaborate, in many data management systems, a bus controller may ask an interface station to retransmit the last value or values transmitted to the bus controller in the last transmitted message. In this discussion, the notion of a value may refer to one or more items of information as long as they are contained in a single message. Generally, a current value for each given parameter is maintained at an associated subsystem memory target address; and in response to receiving such a retransmit request, the interface station simply transmits to the bus controller the value stored at the subsystem memory target address associated with the given parameter at the time of receipt of the retransmit request. The value stored at this subsystem memory location may have changed, however, since the previous transmission of the value for that given parameter, in which case the value transmitted in response to the retransmit request is not the same as the previously transmitted value.

Preferably, when a message is transmitted to the interface station asking for particular data, that data is transmitted to the bus controller and that same data is also written into a temporary buffer, referred to as the retransmit buffer, in memory unit 34. Then, if the retransmit last message request is transmitted to the interface station, the data at the retransmit buffer is sent to the bus controller.

With the above-discussed procedure, the subsystem interface unit can update the value stored at the subsystem memory target address identified in the interface station memory address associated with the original message, while still maintaining the ability of the interface station to retransmit the appropriate specific value in response to receiving a retransmit last message from the bus controller.

Any suitable procedure may be used to determine the values of the interface memory addresses 52 and how to determine which target address is associated with which message that is transmitted to the interface station. For example, since the address map of memory unit 34 can be changed dynamically without interfering with the data being transmitted over data buses 40a and 40b, those target address values and the descriptor fields may be changed by subsystem 24.

With another procedure that may be used when the messages are transmitted to the interface station in the format set forth in MIL-STD 1553, the map addresses can be taken from the 1553 messages themselves. More specifically, the map address associated with each of the possible 1553 messages can be the t/r bit plus the subaddress contained in the 1553 messages—that is, bits 9–14 of the 1553 command word as illustrated in FIG. 3. If more specific control is required, particularly if messages with unplanned word counts are to be detected as illegal, bits 15–19 may be included. This provides a unique map or target address for each 1553 message that is intended to cause the interface station to transmit data.

Also, with this last procedure discussed above, a transmit message—that is, a complete message ready to be transmitted to the bus controller—that is accessed via a map address "A" can exist in its completed form at target address "X," while a new message can be under construction at target address "Y"; and when that new message is completed, only the target address value held at the interface station memory map address "A" has to be updated. This target address value can be updated very quickly and in a manner that does not interfere with the transmission of data over data buses 40a and 40b. Further, with this procedure, there is no need to move a transmit message to a particular transmit area when the message is ready to be transmitted; and still further, the target address or pointer at the interface memory address may be changed while the message is being transmitted to the bus controller without risk of data corruption.

A third source of addresses for the ram map is the mode code field of the 1553 command word—that is, bits 15–19 of the mode code word as illustrated in FIG. 3. This map address is used in a manner similar to the normal transmit or receive messages discussed above.

Because in all three of the above-described procedures, the target addresses in the subsystem memory are determined by the subsystem interface unit and RAM MAP, the user may transmit messages to the interface station in any order, spread the messages apart over time to allow for the largest message size, overlay message areas, or send all illegal messages to the same area in the subsystem memory.

A circular queue counter may also be used as a source of pointers or target addresses for locations in the subsystem memory. For instance, upon receipt of a 1553 command message, the t/r bit plus the address in the message is used, in a first pass, to identify an address in interface station memory 34. If the unique/queue flag in the descriptor field at this memory address is one (indicating the unique mode), then the target address contained at this address identifies the area in the subsystem memory 44 where the message is to be transmitted to or from. However, if that unique/queue flag is zero (indicating the queue mode), a second pass is initiated using a queue count, either to point directly to a target address in system memory, or to point to an index that, in turn, points to a target address in subsystem memory. This queue count may be incremented by one each time it is invoked.

The procedure using a circular queue counter as described immediately above is particularly well suited for handling a multitude of messages having the same interface memory address and transmitted to the interface station over a relatively brief period of time. With a circular queue counter as described above, those messages are mapped into the next available area in the subsystem memory, rather than into just one, unique subsystem address. This allows the subsystem interface unit to process all of these messages without the need for a double buffer or to use any type of interrupt handler. The size of the target queue is only limited to the amount of available memory allocated to this function. This is because the queue count may be used as only an index into the dynamic message map, and the map itself may contain target addresses that are neither contiguous nor static. For instance, if after 30 or so received messages, the subsystem interface unit may alter the target addresses so that the next 32 received messages are stored in some other area of local subsystem memory.

Figure 8:
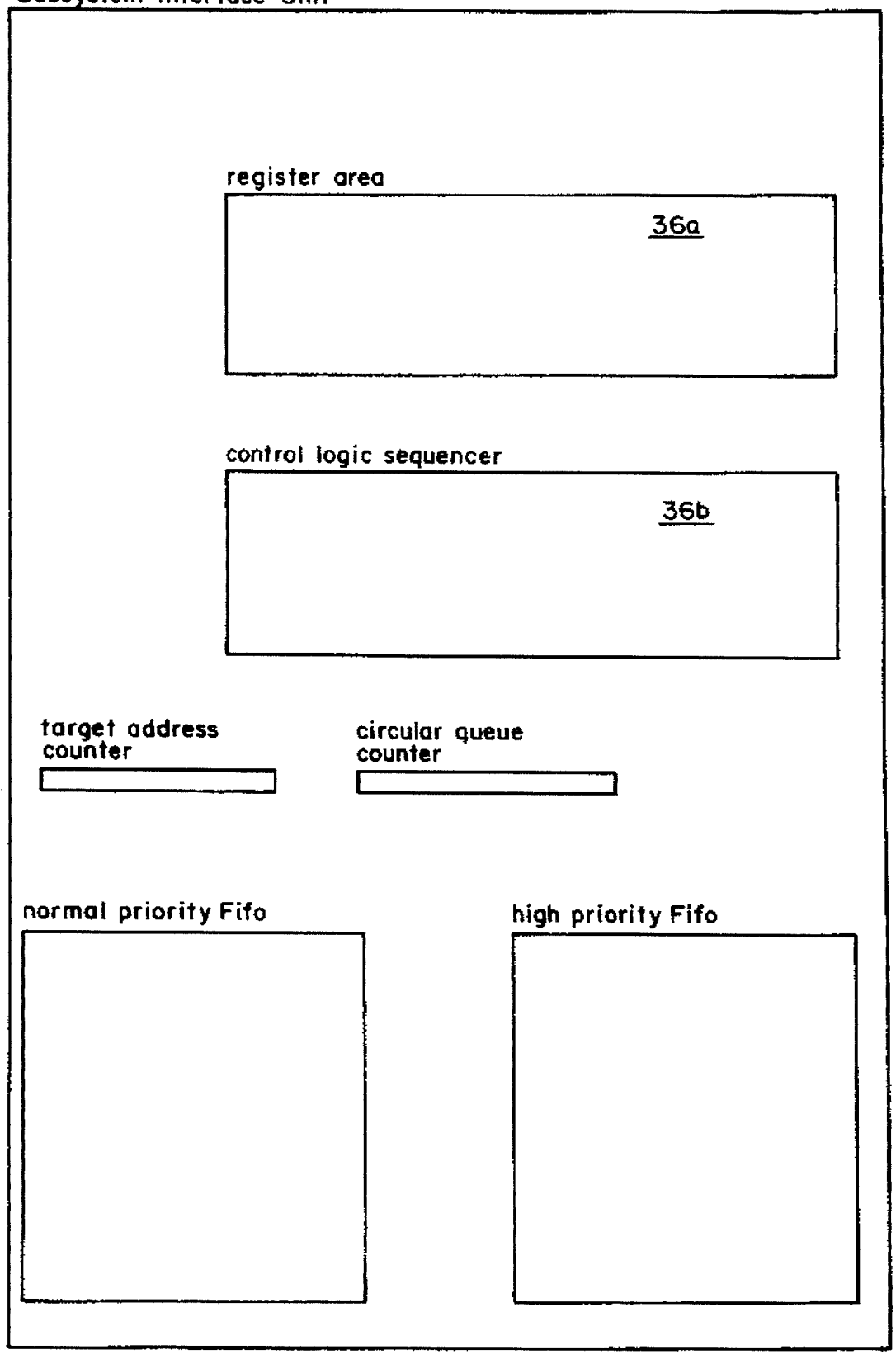
FIG. 8 schematically illustrates in greater detail the subsystem interface unit of the interface station shown in FIG. 2.

With reference to FIG. 8, once a target address has been determined in the subsystem memory for a message, that address is also loaded or written into a target address counter, where that address value is maintained until completion of the transaction required by the message. Preferably, this target address is also loaded or written into one of two activity FIFO registers for the purpose of informing the subsystem of the location of the transaction. In particular, a first of these FIFOs may be used to record the target addresses of messages that are given a normal priority, and the second of these FIFOs may be used to record the target addresses of messages that are to be given a higher priority, which may be indicated by the use of the high priority interrupt flag.

In addition to the target addresses, each FIFO entry is preferably accompanied by a tag that contains the following information:

i) a channel identification to identify the data bus 40a or 40b that was used for the associated transaction;

ii) an illegal command flag to identify the transaction as legal or illegal;

iii) an invalid message flag to identify the transaction as valid or invalid; and iv) a special message flag to identify the transaction as, or as not, requiring immediate servicing.

Upon completion of a transaction initiated by a message, the subsystem interface unit generates an interrupt signal and transmits that signal to the subsystem processor 42. If the message that initiated the transaction was stored in the first or normal FIFO, then a first interrupt signal, referred to as a normal interrupt signal, is generated and transmitted to the subsystem processor 42; while if the message that initiated the transaction was stored in the second or high priority FIFO, then a second interrupt signal, referred to as a high priority interrupt, is generated and transmitted to the subsystem processor 42.

Preferably, the subsystem interface unit 36 of each interface station 14 is able to proclaim the interface station busy upon the occurrence of selected conditions to indicate to the bus controller that the interface station is unable temporarily to transmit or receive data. This is done by setting to one the busy bit in the status word of the interface station and suppressing transmission of data words. These selected conditions may include, for example, receipt of a high priority message, one or both of the above-mentioned FIFO registers becoming full, receipt of a superseding valid command, receipt of an illegal command, or receipt of an invalid message.

This change to the busy state is preferably done automatically by the subsystem interface unit 36 prior to any subsequent commands to avoid possible loss of data. Further, when the interface station is automatically set to busy upon the occurrence of one of the above-mentioned conditions, the subsystem 24 may also be notified of this by means of an interrupt signal, so that the subsystem can take immediate action to remove the condition that caused the interface station to change to the busy state, for example, by emptying the FIFO registers.

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

We claim:

1. A method of operating an interface station located in series between a control station and a subsystem, the interface station being adapted to receive message from and to transmit messages to the control station, and to receive data from and to transmit data to the subsystem, each of the messages having an address field and an instruction field having instructions for the interface station, the interface station comprising a memory including a multitude of map locations, each of the map locations having a respective one address, the method comprising the steps of:

providing each map location with a respective one descriptor field including a set of instruction flags, each of the flags having and being changeable between first and second states;

using the flags to indicate the conditions of a plurality of factors;

transmitting messages to the interface station from the control station, each of the messages having instructions for the interface station to perform a specific task, wherein the interface station has a predetermined procedure for responding to the instructions in each message;

assigning each message a priority;

associating each of the messages with one of the addressable map locations in the memory unit of the interface station; and the interface station, upon receipt of each message from the control station,
i) searching the instruction field of the message for instructions,
ii) checking the states of the flags in the one descriptor field at the memory address associated with the message,
iii) changing the predetermined procedure for responding to the instructions in the message, on the basis of the states of the flags in said one descriptor fields, and
iv) responding to the message by performing said changed procedure;

wherein said set of flags includes a high priority flag, the checking step includes the step of checking the state of the high priority flag in the descriptor field of the map location associated with the message, and the interface station processes the messages received from the control station in an order determined by the priority assigned to each message; and further wherein the step of assigning each message a priority includes the steps of
i) assigning the message a higher priority if the high priority flag in the descriptor field in the map location associated with the message is in the first state, and
ii) assigning the message a lower priority if the high priority flag in the descriptor field in the map location associated with the message is in the second state.

2. A method according to claim 1, wherein the interface station includes a subsystem interface unit holding a status word to indicate a plurality of predetermined conditions of the interface station, and the status word includes a busy bit, and further comprising the step of:

the subsystem interface unit, setting the busy bit to a busy state upon receipt of selected ones of the messages by the interface station, to inhibit for a given period of time (i) transmission of further messages to the interface station from the control station, and (ii) transmission of messages from the interface station to the control station.

3. A method according to claim 2, wherein the setting step includes the step of setting the busy bit to the busy state upon receipt of a high priority message by the interface station.

4. A method according to claim 1, wherein the subsystem includes a memory having a multitude of memory locations, each of the memory locations having a respective one target address, and wherein:

the providing step includes the step of
i) providing each map location with one of the target addresses, and
ii) providing each descriptor field with a unique/queue flag;

the checking step includes the step of checking the unique/queue flag in the descriptor field in the map location associated with the message;

the responding step includes the steps of
i) if the unique/queue flag in the descriptor field in the map location associated with the message is in the first state, transmitting at least a part of the message to the memory location in the subsystem having the target address identified in the map location associated with the message, and
ii) if the unique/queue flag in the descriptor field in the map location associated with the message is in the second state, transmitting at least a part of the message to an end of a queue in the subsystem memory.

5. A method according to claim 1, wherein the subsystem includes a memory having a multitude of memory locations, each of the memory locations having a respective one target address, and one of the memory locations is a retransmit buffer;

the providing step includes the steps of
i) providing each map location with one of the target addresses, and
ii) providing each descriptor field with a retransmit flag;

the transmitting step includes the step of transmitting a retransmit message to the interface station;

the step of providing each map location with one of the target addresses includes the step of providing the map location associated with the retransmit message with the target address of the retransmit buffer;

the checking step includes the step of checking the retransmit flag in the descriptor field in the map location associated with the message;

the responding step includes the step of if the retransmit flag in the check descriptor field is in the first state,
i) transmitting to the control station, data from the memory location having the target address identified in the associated map location, and
ii) copying said data into the retransmit buffer.

6. A method according to claim 1, wherein the subsystem includes a memory having a multitude of memory locations, each of the memory locations having a respective one target address, and one of the memory locations is a default block, and wherein:

the providing step includes the steps of
i) providing each map location with one of the target addresses, and
ii) providing each descriptor field with an autoclear flag;

the checking step includes the step of checking the autoclear flag in the descriptor field in the map location associated with the message; and the responding step includes the steps of if the autoclear flag is in the first state in the descriptor field in the map location associated with the message,
i) transmitting to the control station, data from the memory location having the target address identified in the associated map location, and
ii) changing the target address value identified in the associated map location to the target address of the default block.

7. A method according to claim 1, wherein the providing step includes the step of providing all of the map locations with an identical set of instruction flags.

8. A method according to claim 1, further comprising the step of, the interface station, changing the states of at least selected ones of the flags in response to predetermined events.

9. An interface station located in series between a control station and a subsytem, the interface station comprising:

first input-output means to transmit messages to and to receive messages from the control station, each of the messages having an address field and an instruction field having instructions for the interface station;

second input-output means to transmit messages to and to receive messages from the subsystem;

a memory unit connected to both the first and second input-output means and including a multitude of addressable map locations, each of the map locations including a descriptor field having a set of flags, each of the flags having and being changeable between first and second states to indicate conditions of a plurality of factors, wherein each of the messages transmitted to the interface station from the control station is associated with one of the map locations; and means for responding to messages transmitted to the interface station, wherein the responding means has a predetermined procedure for responding to the instructions in each message, and the responding means is adapted, upon receipt of each message from the control station,
  (i) to search the instruction field of the message for instructions,
  (ii) to check the states of the flags in the one descriptor field at the memory address associated with the message,
  (iii) to change the predetermined procedure for responding to the instructions in the message, on the basis of the states of the flags in said one descriptor field, and
  (iv) to respond to the message by performing said changed procedure;

wherein each of said set of flags includes a high priority flag; and the means for responded is adapted to assign each message a priority, and to process the messages received from the control station in an order determined by the priorities assigned to the messages; and wherein the means for responding is adapted, upon receipt of each message transmitted to the interface station,
  i) to check the state of the priority flag in the descriptor field in the map location associated with the message,
  ii) to assign the message a higher priority if the high priority flag in the descriptor field in the map location associated with the message is in the first state, and
  iii) to assign the message a lower priority if the high priority flag in the descriptor field in the map location associated with the message is in the second state.

10. An interface station according to claim 9, further comprising:
  a subsystem interface unit holding a status word to indicate a plurality of predetermined conditions of the interface station, said status word including a busy bit;
  the subsystem interface unit is adapted to set the busy bit to a busy state upon receipt of selected ones of the messages by the interface station to inhibit for a given period of time, (i) transmission of further messages to the interface station from the control station, and (ii) transmission of messages from the interface station to the control station.

11. An interface station according to claim 9, wherein the subsystem includes a memory having a multitude of memory locations, each of the memory locations having a respective one target address, and wherein:
  each of the map locations identifies one of the target addresses;
  one of the flags in each of the descriptor fields is a unique/queue flag;
  the means for responding is adapted, upon receipt of each message transmitted to the interface station from the control station,
  to check the unique/queue flag in the descriptor field in the map location associated with the message,
  if the unique/queue flag in the descriptor field in the map location associated with the message is in the first state, to transmit at least a part of the message at the memory location in the subsystem having the target address identified in the map location associated with the message, and
  if the unique/queue flag in the descriptor field in the map location associated with the message is in the second state, to transmit to the control station at least said part of the message to an end of a queue in the subsystem memory.

12. An interface station according to claim 9, wherein the subsystem includes a memory having a multitude of memory locations, each of the memory locations having a respective one target address, and one of the memory locations being a default block, and wherein:
  each of the map locations identifies one of the target addresses;
  one of the flags in each of the descriptor fields is an autoclear flag;
  the means for responding is adapted, upon receipt of each message transmitted to the interface station,
  to check the autoclear flag in the descriptor field in the map location associated with the message, and
  if the autoclear flag in the descriptor field in the map location associated with the message is in the first state,
    i) to transmit to the control station, data from the memory location identified by the target address in the associated map location, and
    ii) to change the target address value identified in the associated map location to the target address of the default block.

13. An interface station according to claim 9, wherein the subsystem includes a memory having a multitude of memory locations, each of the memory locations having a respective one target address, and one of the memory location being a retransmit buffer, and wherein:
  each of the map locations identifies one of the target addresses;
  one of the flags in each of the descriptor fields is a retransmit flag;
  one of the messages transmitted to the interface station from the control station is a retransmit message;
  the map location associated with the retransmit message identifies the address of the retransmit buffer;
  the processing means is adapted, upon receipt of each message transmitted to the interface station from the control station,
  to check the retransmit flag in the descriptor field in the map location associated with the message,
  if the retransmit flag in the descriptor field is in the first state,
    i) to transmit to the control station, data from the memory location having the target address in the associated map location, and
    ii) to copy said data into the retransmit buffer.

* * * * *